(12) United States Patent
Gunturi et al.

(10) Patent No.: US 7,817,736 B2
(45) Date of Patent: Oct. 19, 2010

(54) CORRECTING FOR CARRIER FREQUENCY OFFSET IN MULTI-CARRIER COMMUNICATION SYSTEMS

(75) Inventors: Sarma S Gunturi, Bangalore (IN); Jawaharlal Tangudu, Bangalore (IN); Nagasatya Srikanth Puvvada, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 11/770,806

(22) Filed: Jun. 29, 2007

(65) Prior Publication Data
US 2009/0003493 A1 Jan. 1, 2009

(51) Int. Cl.
*H04L 27/28* (2006.01)
(52) U.S. Cl. .................. 375/260; 375/316; 375/371; 370/516
(58) Field of Classification Search .......... 375/260, 375/316, 371; 455/17; 370/208, 480, 516
See application file for complete search history.

(56) References Cited

U.S. PATENT DOCUMENTS

| 6,704,374 | B1 * | 3/2004 | Belotserkovsky et al. ... 375/326 |
| 7,123,670 | B2 | 10/2006 | Gilbert et al. |
| 2004/0071234 | A1 * | 4/2004 | Li ............................. 375/341 |
| 2004/0161047 | A1 * | 8/2004 | Liu et al. .................... 375/260 |
| 2005/0058193 | A1 | 3/2005 | Saed |
| 2006/0222095 | A1 | 10/2006 | Niu et al. |
| 2006/0239370 | A1 | 10/2006 | Mody et al. |
| 2007/0133391 | A1 * | 6/2007 | Roh et al. ................... 370/208 |

FOREIGN PATENT DOCUMENTS

WO 2006011012 A1 2/2006

OTHER PUBLICATIONS

Alan J. Coulson, "Narrowband Interference in Pilot Symbol Assisted OFDM Systems", pp. 2277 to 2287, IEEE Transactions on Wireless Communications, vol. 3, No. 6, Nov. 2004.
Sekchin Chang and Edward J. "Powers, Cancellation of Inter-Carrier Interference in OFDM Systems Using a Nonlinear Adaptive Filter",pp. 1039 to 1043, Year 2000 IEEE.
Yuping Zhao, Sven-Gustav Haggman, "Sensitivity to Doppler Shift and Carrier Frequency Errors in OFDM Systems-The Consequences and Solutions", pp. 1564 to 1568IEEE 46th Vehicular Technology Conf, Year Apr. 1996.

\* cited by examiner

*Primary Examiner*—Mohammad H Ghayour
*Assistant Examiner*—Leila Malek
(74) *Attorney, Agent, or Firm*—Steven A. Shaw; W. James Brady; Frederick J. Telecky, Jr.

(57) ABSTRACT

A multi-carrier (MC) receiver receives a multi-carrier signal containing data symbols as well as pilot symbols. The MC receiver estimates a carrier frequency offset in a downconverted base-band multi-carrier signal in the frequency domain based on deviations of one or more characteristics of the pilot signals from predetermined values, and corrects for the offset in the time domain. In an embodiment, a second order phase locked loop (PLL) estimates the phase of the pilot signals to determine the carrier frequency offset. Changes in pilot phases caused due to the time domain correction are cancelled to allow the PLL to minimize deviations from the lock position.

9 Claims, 5 Drawing Sheets

CORRECTING FOR CARRIER FREQUENCY OFFSET IN MULTI-CARRIER COMMUNICATION SYSTEMS

BACKGROUND

1. Field of the Invention

The present disclosure relates generally to communication systems, and more specifically to a technique for correcting carrier frequency offset in multi-carrier communication systems.

2. Related Art

Multi-carrier communication (MC) techniques are often used both in wire-line and wireless telecommunication systems to transmit multiple streams of symbols, with each symbol typically containing one or more bits. In a MC system, a transmission band/channel is divided into a number of narrow bandwidth sub-channels, and in a transmitter device in a MC system each stream of symbols may be modulated on a corresponding sub-channel carrier signal.

Generally each sub-channel carrier signal is modulated (using techniques such as Quadrature Phase Shift Keying (QPSK), Quadrature Amplitude Modulation (QAM), etc., well known in the relevant arts) to encode the corresponding stream of symbols. The resulting sub-channel signals may be added together to generate a single base-band multi-carrier signal, by techniques such as inverse discrete Fourier transform (IDFT) or inverse fast Fourier transform (IFFT). The base-band multi-carrier signal may then be shifted (commonly referred to as upconversion) to a desired higher frequency band suitable for transmission using a high frequency carrier signal.

A receiver device obtains the base-band multi-carrier signal by shifting the higher frequency band signal back to the base-band frequency (commonly referred to as "down conversion"). The stream of symbols encoded in each sub-channel is derived from the base-band signal by using transform techniques such as DFT, FFT, etc. The data corresponding to each symbol is then recovered by suitably demodulating (based on the modulation technique adapted at the transmitter system) the corresponding sub-channel carrier signal.

Typically, at the receiver device, the down conversion (shifting of high frequency signal to base band signal) is performed using a locally generated carrier signal having a frequency value equal to the high frequency carrier signal used at the transmitter device. The difference in frequency value of locally generated carrier signal and carrier of the received signal (which may be due to oscillator frequency drift, Doppler effects, etc., well known in the relevant arts) is generally referred to as a carrier frequency offset.

One general requirement for accurate recovery of data using MC techniques is that the frequency of the locally generated carrier signal used in the receiver device, needs to equal the frequency of the signal transmitted. In other words, the carrier frequency offset needs to ideally equal zero.

When the offset deviates from the ideal zero, data bits from a multi-carrier system may not be recovered accurately. Such a problem is of particular concern in telecommunication systems using Orthogonal Frequency Division Multiplexing (OFDM) techniques or Discrete Multi-tone Techniques (DMT) due to the overlap of the sub-channel frequencies, and effects of inter-channel interference (ICI) that may be caused due to carrier frequency offsets.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

An aspect of the present invention determines a carrier frequency offset of a multi-carrier signal by examining pilot symbols in frequency domain and corrects the offset by processing the multi-carrier signal in time domain.

Due to the correction in time domain, the computational complexity may be reduced. In an embodiment, as the pilot symbols are received in parallel along with data symbols, corrections may be performed potentially for each data symbol. As a result, variations in carrier frequency offset even within a duration of a packet, may be corrected.

According to another aspect of the present invention, a multi-carrier receiver uses a phase locked loop (PLL) to track the phases of one or more pilot symbols. Changes in pilot phases caused due to carrier frequency offset correction in the time domain are cancelled to allow the PLL to operate without disruption.

According to another aspect of the present invention, a PLL used to track the phase of a pilot signal generates an estimate of the current phase of the pilot signal based both on past phase values of the pilot signal as well as a current phase value of the pilot signal obtained during processing to recover data and pilot symbols. The PLL may thus be more immune to phase noise effects.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

Example Multi-Carrier Telecommunication System

Figure 1:
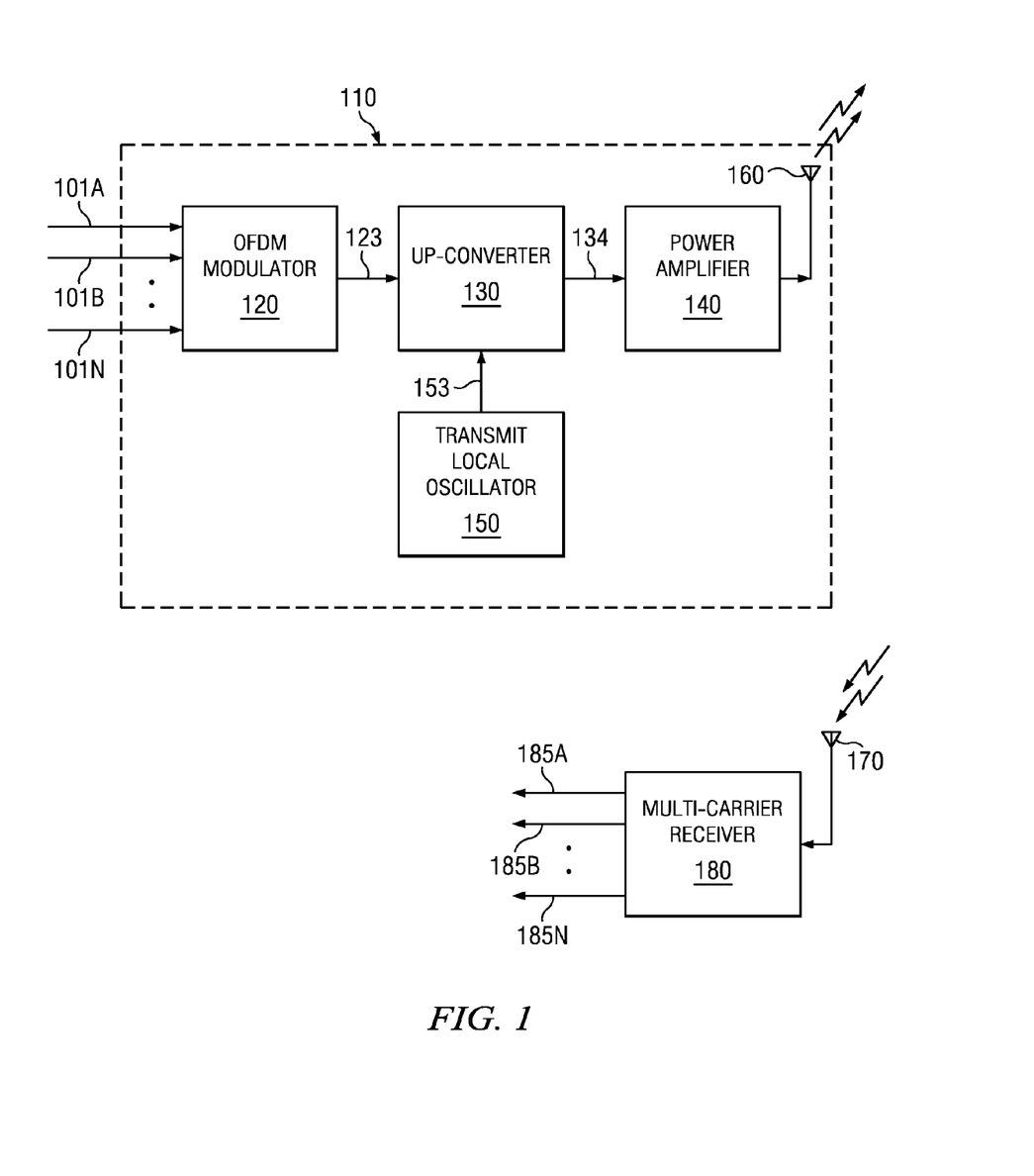
FIG. 1 is a block diagram illustrating an example multi-carrier (MC) telecommunication system in which several aspects of the present invention can be implemented.

FIG. 1 is a block diagram illustrating an example multi-carrier (MC) telecommunication system in which several aspects of the present invention can be implemented. The block diagram is shown containing MC transmitter 110 and MC receiver 180. For simplicity, only a single transmitter and receiver are shown in the figure. However, a typical MC communication system may contain multiple transmitters and multiple receivers, with communication potentially between all receivers and transmitters. Each block in FIG. 1 is described below in further detail.

The details of example embodiment of MC transmitter 110 are shown merely as an illustration, however, MC receiver 180 can operate with other transmitters as well. Thus, MC transmitter 110 is shown containing Orthogonal Frequency Division Multiplexing (OFDM) modulator 120, up-converter 130, power amplifier 140, transmit local oscillator 150 and transmitter antenna 160.

OFDM modulator 120 receives a number of bit streams 101A through 101N and generates a multi-carrier signal (base band) on path 123. In general, for each of a time period termed as a symbol period, OFDM modulator 120 receives N bits as input (from input bit streams 101A-101N) and forms a corresponding (single) OFDM symbol. Each of the input bit streams 101A-101N may generated from a different external system or be generated by a single source. Some of bit streams 101A-101N constitute pilot symbols while the other bit streams may constitute data symbols.

In general, data symbols represent data sought to be transported for the purpose of supporting higher level applications (e.g., user applications such as voice, etc., sending the corresponding stream on input paths), while the pilot symbols are introduced to aid reliable recovery of the data symbols at the receiver end. For example, the 802.11a OFDM standard specifies four BPSK modulated pilot streams, one each transmitted on sub-carrier numbers −21, −7, 7, and 21, while data symbols are transmitted on the remaining 48 (out of 52) sub-carriers. Thus, during each symbol period some sub-channels in the multi-carrier base-band signal 123 contain data symbols (signals) while others contain pilot symbols.

Up-converter 130 receives the multi-carrier signal on path 123 and shifts the multi-carrier signal to higher frequency band using a high frequency carrier signal 153 generated by transmit local oscillator 150. Power amplifier 140 receives the up-converted high frequency multi-carrier signal (RF) on path 134 from up-converter 130, amplifies and transmits (via path 146) the signal using antenna 160.

MC receiver 180 receives a high frequency multi-carrier (RF) signal via antenna 170, and recovers the transmitted bit streams 101A-101N and provides them on paths 185A-185N respectively. The recovered bit streams provided on respective paths 185A-185N may be forwarded to a processor for further processing.

As noted above, the frequency offset between a locally generated carrier signal (not shown in FIG. 1) used in MC receiver 180 and the carrier frequency of the signal transmitted (i.e. frequency of transmit local oscillator output 153) should ideally be zero. The manner in which MC receiver 180 corrects for a carrier frequency offset according to an aspect of the present invention is described next with respect to a flowchart.

Correcting for Carrier Frequency Offset

Figure 2:
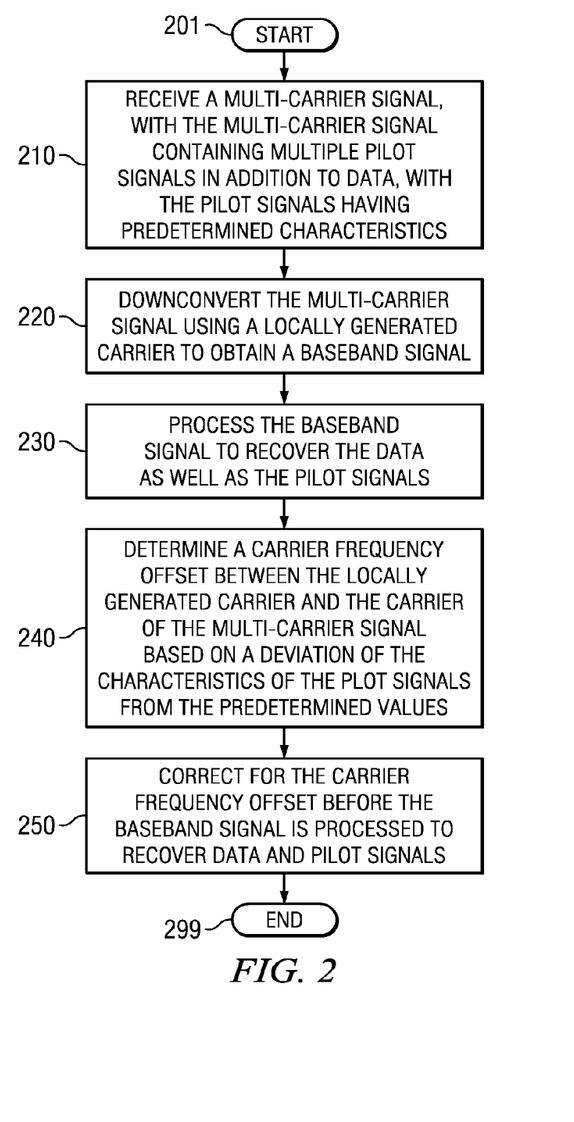
FIG. 2 is a flowchart illustrating the manner in which a multi-carrier receiver corrects for a carrier frequency offset according to an aspect of the present invention.

FIG. 2 is a flowchart illustrating the manner in which a multi-carrier receiver corrects for a carrier frequency offset according to an aspect of the present invention. The flowchart is described with respect to FIG. 1, and in relation to MC receiver 180 merely for illustration. However, various features can be implemented in other environments and using other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, MC receiver 180 receives a multi-carrier signal, with the multi-carrier signal containing multiple pilot signals in addition to data, with the pilot signals having predetermined (or fixed) characteristics. In an embodiment, the received multi-carrier signal contains pilot signals on four sub-carriers in addition to streams of data on other sub-carriers. Control then passes to step 220.

In step 220, MC receiver 180 down-converts the multi-carrier signal using a locally generated carrier to obtain a base band signal. The down-conversion may be performed using any of well-known techniques such as mixing the multi-carrier signal by a locally generated carrier and subsequent filtering to remove unwanted sidebands. Alternatively, sub-sampling/undersampling techniques may also be used to down-convert the multi-carrier signal to a base-band signal of lower frequency. Control then passes to step 230.

In step 230, MC receiver 180 processes the base-band signal to recover the data as well as the pilot signals/symbols. The processing may involve operation such as performing an FFT (Fast Fourier Transform) of the base-band signal. Control then passes to step 240.

In step 240, MC receiver 180 determines a carrier frequency offset between the locally generated carrier in MC receiver 180 and the carrier of the multi-carrier signal based on a deviation of the characteristics of the pilot signals from the predetermined values. In an embodiment described below, MC receiver 180 estimates a deviation in the phase of at least one pilot signal to determine the carrier frequency offset. Control then passes to step 250.

In step 250, MC receiver 180 corrects for the carrier frequency offset before the base-band signal is processed to recover the data and pilot signals in step 230. Control then passes to step 299, in which the flow chart ends.

It is noted here that MC receiver 180 may perform an initial (often rough) estimate of the carrier frequency offset in the time domain (i.e. before a transform operation such as an FFT on the multi-carrier signal) after the down-conversion in step 220, and correct the initial estimate of the frequency offset by a corresponding amount. It must be noted that such an initial estimation and correction performed in step 220 may not completely remove the carrier frequency offset, and further estimation and correction is required according to various aspects of the present invention, as described above.

The features described above can be implemented in various embodiments. At least some of the features described above are further illustrated with respect to an example embodiment of MC receiver 180 according to several aspects of the present invention.

4. Multi-carrier Receiver

Figure 3:
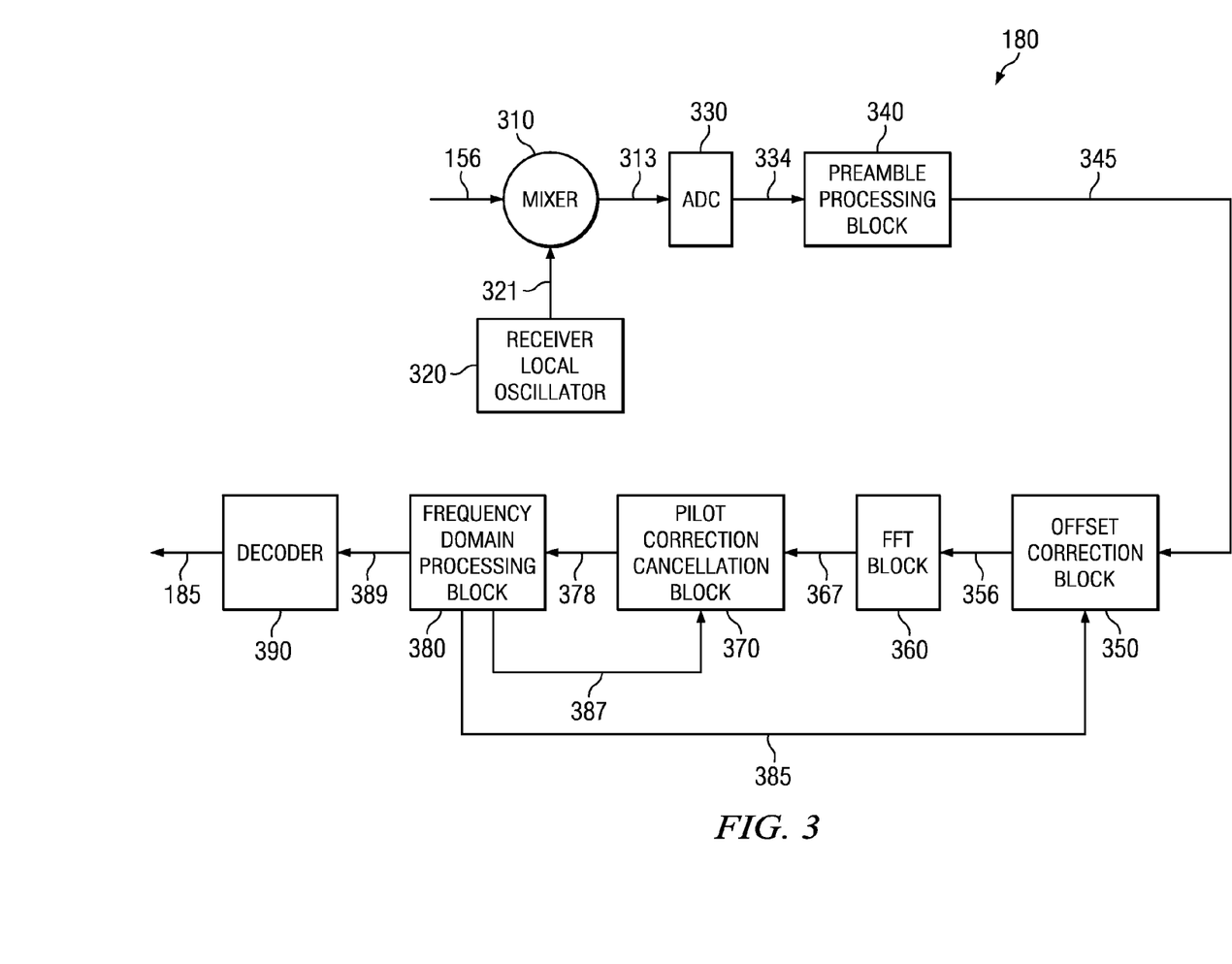
FIG. 3 is a block diagram of a multi-carrier receiver in an embodiment of the present invention.

FIG. 3 is a block diagram of a multi-carrier receiver in an embodiment of the present invention. MC receiver 180 is shown containing mixer 310, receiver local oscillator 320, analog to digital converter (ADC) 330, preamble processing block 340, offset correction block 350, FFT block 360, pilot correction cancellation block 370, frequency domain processing block 380 and decoder 390. Each block/component is described in detail below.

Mixer 310 receives a multi-carrier RF signal on path 156, and a carrier signal from receiver local oscillator 320 on path 321, and down-converts the multi-carrier RF signal to a lower frequency multi-carrier base-band signal provided on path 313. Mixer 310 may also contain one or more low pass filters within it to remove unwanted sidebands produced during the mixing operation. Mixer 310 (including low pass filters) and receiver local oscillator 320 may together be viewed as a down-converter. The mixing and down-conversion operations may be performed in a known way.

ADC 330 receives the multi-carrier base-band signal on path 313 in analog form and converts the signal to digital form, and forwards the resulting digital codes on path 334. Each digital code represents the strength of the multi-carrier base-band signal at the sampled time instance.

Preamble processing block 340 performs operations such as channel estimation and time synchronization based on, for example, the training symbols present in a preamble portion of the multi-carrier base-band signal. In general, channel estimation determines the characteristics, such as phase delay and magnitude change caused by a transmission channel (for example, a wireless medium) for each of the sub-carrier frequencies, and generates corresponding compensation terms.

Time synchronization generally refers to estimating correct time instances at which sampling windows used in a later stage (FFT block 360 described below) may need to be aligned to reliably recover the transmitted data and pilot signals. Preamble processing block 340 forwards the multi-carrier base-band signal on path 356. The estimated sampling windows and channel compensation terms may also be provided to the downstream blocks for further processing. Further, as noted above, preamble processing block 340 may perform an initial rough estimate of the carrier frequency offset, and correct for the initial estimate of the frequency offset by a corresponding amount to enable further processing of the multi-carrier signal. Preamble processing block 340 may be implemented in a known way.

Offset correction block 360 operates to correct a carrier frequency offset of the multi-carrier base-band signal received on path 345 using a frequency offset correction factor on path 385. The carrier frequency offset may be corrected in all sub-channel signals (i.e., pilot signals as well as data signals). Offset correction block 350 forwards a carrier frequency offset corrected multi-carrier base-band signal (as well as the sampling windows and channel compensation terms noted above) on path 356.

FFT block 360 receives a carrier frequency offset corrected multi-carrier base band signal from offset correction block 350 on path 356 and recovers symbols (both data as well as pilot) corresponding to each sub-channel by using transform techniques such as DFT or FFT. FFT block 360 may be viewed as a signal/symbol recovery block operating to recover symbols from the multi-carrier base-band signal.

Pilot correction cancellation block 370 receives the data symbols and pilot symbols from FFT block 360 on path 367, and operates to undo the correction applied by offset correction block 350 to the pilot symbols using a cancellation factor received on path 387 from frequency domain processing block 380. As the status of the pilot symbols is used subsequently for determining the frequency offset, the correction enables the determination to be unaffected by the correction done in time domain by the block 350. Pilot correction cancellation block 370 forwards the data symbols and the pilots symbols (with correction removed) to frequency domain processing block 380. The operation of pilot correction cancellation block 370 in an example embodiment is described in detail in sections below Frequency domain processing block 380 estimates a carrier frequency offset from one or more characteristics of the pilot symbols received from pilot correction cancellation block 370.

In an embodiment, frequency domain processing block 380 determines a carrier frequency offset based on a phase of a pilot signal. Alternatively, frequency domain processing block 380 may use a combination (such as a weighted average of phases of multiple pilot signals) to determine the frequency offset. In general, the frequency offset can be determined using any technique, several of which are well known in the relevant arts.

Frequency domain processing block 380 provides as feed back the determined frequency offset to offset correction block 350. Frequency domain processing block 380 forwards the data symbols to decoder 390. The operation of frequency domain processing block 380 in an example embodiment is described in greater detail in section below.

Decoder 390 converts each symbol into corresponding digital value stream on path 185 (containing sub-paths 185A through 185N shown in FIG. 1). The digital values corresponding to each channel are forwarded on the corresponding sub-path 185A-185N.

Mixer 310, receiver local oscillator 320, analog to digital converter (ADC) 330, preamble processing block 340, and offset correction block 350 and FFT block 360 operate on (input) signals in the time domain, while pilot correction cancellation block 370, frequency domain processing block 380 operate on signals in the frequency domain. Specifically, FFT block 360 transforms an input multi-carrier base-band signal from the time domain to the frequency domain.

Thus, according to an aspect of the present invention, carrier frequency offset is determined in the frequency domain (by frequency domain processing block 380), and a corresponding carrier frequency offset correction factor is provided to correct the offset (subsequent portion of the multi-carrier base-band signal) in the time domain.

By correcting the carrier frequency offset in the time domain, the computational complexity is reduced (compared to correction in the frequency domain).

The description is continued with an illustration of the operation of frequency domain processing block 380 in an embodiment of the present invention. First, the effect of carrier frequency offset on pilot symbol phases is described briefly.

Pilot Symbol Phases

Figure 4A:
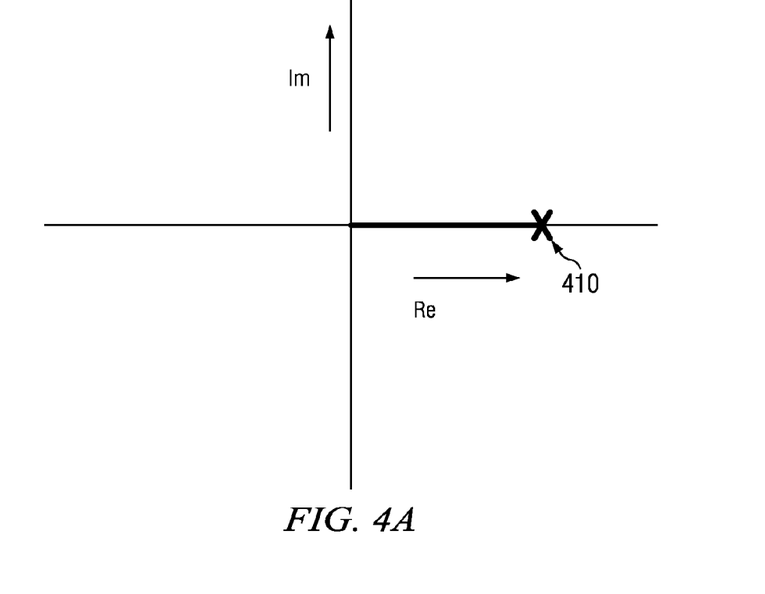
FIGS. 4A and 4B are diagrams together illustrating the effect of carrier frequency offset on the phases of pilot signals in a multi-carrier signal.
Figure 4B:
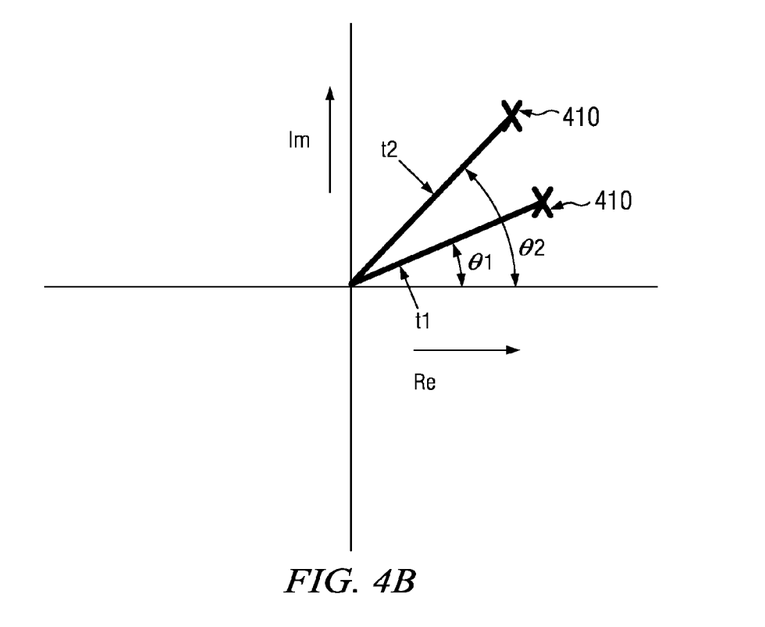

FIGS. 4A and 4B together illustrate the effect of carrier frequency offset on the phases of pilot symbols (signals).

FIG. 4A shows a pilot signal 410 with a predetermined phase zero before down-conversion using receiver local oscillator 320, and plotted on a complex plane with the real (Re) component along x-axis and imaginary (in) component along y-axis.

FIG. 4B illustrates the phases of pilot signal 410 after down-conversion. At a time instance t1, the phase of pilot signal 410 is shown retarded by an angle θ1. At a later time instance t2, the phase is shown retarded by an angle θ2. In general, the effect of carrier frequency offset is to change the phases of pilot signals from a predetermined (and fixed) value.

Figure 5:
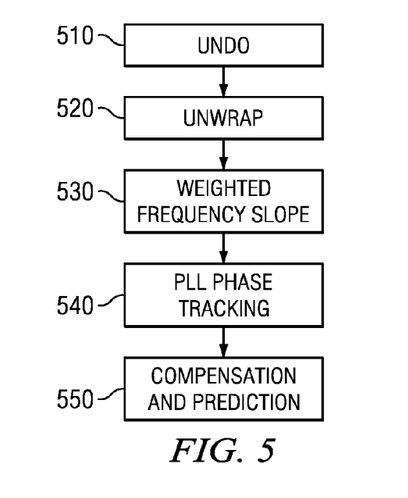
FIG. 5 is a flow diagram illustrating the operations performed in a multi-carrier receiver to determine a carrier frequency offset in one embodiment.

According to an aspect of the present invention, frequency domain processing block 380 determines a carrier frequency offset based on a deviation of phase of one or more pilot signals, as described next with respect to a flow diagram.

Frequency Domain Processing

FIG. 5 is a flow diagram illustrating the operations performed by frequency domain processing block 380 in determining a carrier frequency offset in one embodiment. Each of the blocks 510-550 may be implemented substantially in hardware form, although they may also be implemented in any combination of hardware, firmware and software form. The operations in each block are performed block during each symbol interval of the multi-carrier signal, and are briefly described below.

'Undo' block 510 cancels the advancement (add) or delaying (skip) of sampling instances (that determine sampling windows used by FFT block 360 of FIG. 3) caused by application of sampling frequency offset compensation to enable proper tracking of accumulating sampling frequency offset. Sampling frequency is generally the frequency at which samples of the multi-carrier signal are generated (for example, by ADC 330 of FIG. 3) for processing in the digital domain.

Pilot phase error values are observable in a range of +/−180 degrees. However, the actual phase error may extend beyond this range as phase error accumulates over time, i.e., 'wraps' around a circle of +/−360 degrees. Thus an 'unwrapping' of pilot phase error is performed by 'unwrap' block 520. Unwrapping is done based on the assumption that a phase error greater than +/−180 degrees will not occur during a time period of the first seven symbols.

Then, in 'Weighted Frequency Slope' block 530, the phases of individual current pilot signals are combined with appropriate weights to generate a single combined pilot phase (also termed weighted frequency slope). The weight applied to an individual pilot may be derived from the channel response on the particular pilot sub-carrier.

In 'PLL phase tracking' block 540, the combined pilot phase is provided as an input to a phase locked loop (PLL). The PLL uses the past and current values of the single pilot phase, add/skip values (generated by 'undo' block, described above) and PLL parameters to produce an estimate of the current pilot phase. The PLL parameters can be changed over time at fixed time intervals so that PLL bandwidth can be controlled adaptively depending on the need for tracking non-linear phase variations across a packet.

In 'compensation and prediction' block 550, the current combined pilot phase estimated by the PLL is used to compensate for the rotation due to frequency offset on the data sub-carriers (i.e. to compensate for the effects of the carrier frequency offset on the data). Furthermore, the phase estimate produced by the PLL is also used to predict the weighted frequency slope in the next symbol interval.

Assuming f0 is the estimated carrier frequency offset, an offset correction factor is generated as given by the following equation:

$$\text{offset correction factor} = e^{\wedge}(-j*[0:N-1]*2*pi*f(k)*Ts) \quad \text{Equation 1}$$

wherein,

N represents the number of points used by FFT block 360 to compute an FFT, f(k) is the estimated carrier frequency offset at symbol period k, Ts is the sampling period, j is the complex operator, ^ represents the 'power of' operator.

Referring to FIG. 3, offset correction block 350 receives the offset correction factor as noted in equation 1, and applies the correction by multiplying the multi-carrier base-band signal with the offset correction factor.

Figure 6:
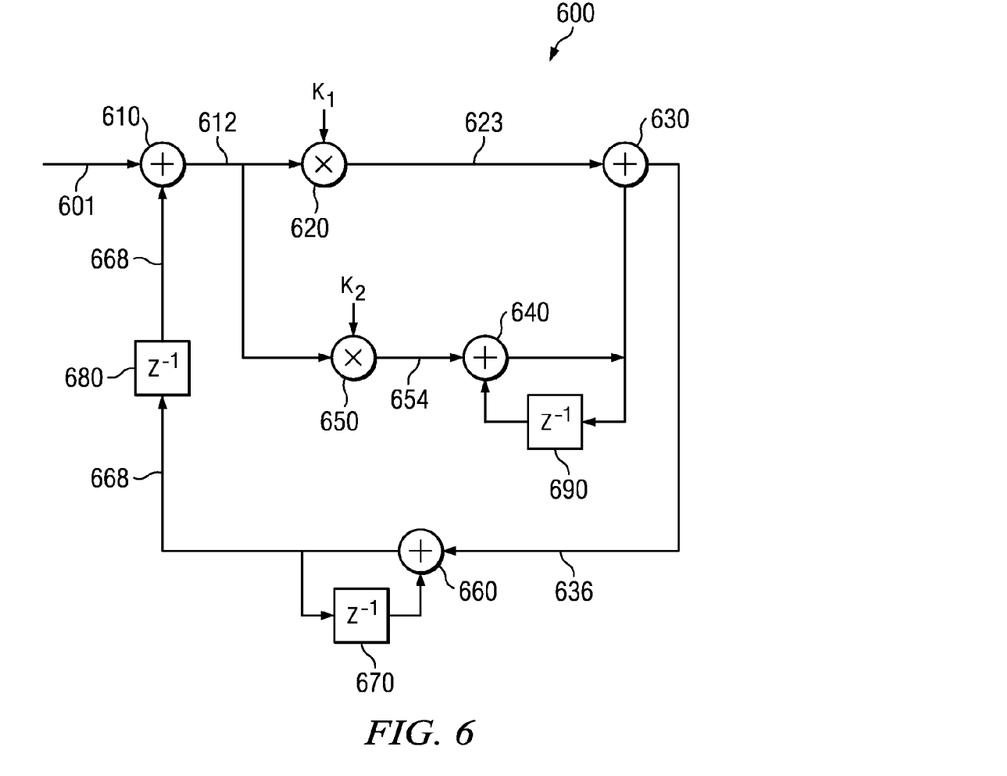
FIG. 6 is a block diagram of a phase locked loop (PLL) used to track pilot phases in one embodiment.

FIG. 6 is a block diagram of a second order PLL 600 used by PLL phase tracking block 540 noted above. Phase input to PLL 600 is provided on path 601. The phase input θk on path 601 may be the phase of a (single) pilot sub-carrier or an average of the phases of multiple pilot sub-carriers during a current symbol period 'k', as provided by FFT block 360 of FIG. 3. PLL 600 provides a predicted value θkP of the phase of a pilot symbol for a current symbol period on path 668 based on the past values (during past symbol periods) of phases of the pilot symbol.

An error signal e(k) is generated by summer 610 on path 612. The error signal is given by the following equation:

$$e(k)=\theta(k)-\theta(k)P \quad \text{Equation 2}$$

Error signal e(k) is multiplied (in multiplier 620) by a constant K1 to produce a term K1*(e(k) on path 623, wherein the constant K1 may be chosen (programmable) based on desired operational characteristics of PLL 600.

Error signal e(k) is multiplied (in multiplier 650) by a constant K2 to produce a term K2*e(k) on path 654, wherein the constant K2 may be chosen (programmable) based on desired operational characteristics of PLL 600.

Term K2*e(k) is integrated by the combination of summer 640 and delay block 690 and added with the term on path 623 by summer 630. The output of summer 630 is again integrated by the combination of summer 660 and delay block 670 and provided to delay block 680 on path 668. The output of delay block 680 on path 668 represents the predicted phase θ(k)P. Thus, θ(k)P represents the predicted phase of the pilot signal at a current symbol period. Since PLL 600 is implemented as second order PLL, it can track carrier frequency offset variations over time.

Equations 3 and 4 provided below illustrate the operations of PLL 600:

$$f(k)=f(k-1)+K2*e(k) \quad \text{Equation 3}$$

wherein, f(k) is the estimate of the carrier frequency offset (as noted above in equation 1) in a current symbol period k, and represents the phase added in the symbol interval k to k+1, f(k−1) is the estimated frequency offset in an immediately previous symbol period.

$$\theta(k+1)P=\theta(k)P+f(k)+k1*e(k) \quad \text{Equation 4}$$

wherein,

θ(k+1)P represents the predicted phase of the pilot signal at a next symbol period (K+1)

PLL 600 described above uses the combined pilot phases of symbols 0 to (k−1) (i.e., past symbols during past symbol periods 0 through k−1) to get an estimate for the phase at a current symbol period k. In other words, phase information of pilot symbol at a current symbol interval is not used to estimate phase at the current symbol period.

To improve performance, PLL 600 may be modified to generate an estimate of the current phase of the pilot signal using both a current phase value of the pilot signal (generated by FFT block 360) as well as past phase values of the pilot signals.

In an embodiment, such modification may be effected in manner illustrated by the following equations:

$$\theta(k)Pm=\theta(k+1)P-f(k) \quad \text{Equation 5a}$$

$$\text{i.e, } \theta(k)Pm=\theta(k)P+K1*e(k) \quad \text{Equation 5b}$$

wherein θ(k)Pm is the modified representation of the predicted phase at a current symbol period. Estimate θ(k)Pm uses the phase information from symbols 0 through k, and is therefore more robust to phase noise effects.

While phase estimation of the pilot signal in the foregoing description is provided with respect to a PLL, other techniques such as linear regression techniques may also be used to estimate the phase of the pilot signals. Further, while phase of the pilot signals is used to determine carrier frequency offset in the description provided above, any other predetermined characteristics of the pilot signals may also be used It may be noted from the foregoing description that frequency offset correction performed in the time domain (in offset correction block 350 before FFT block 360 recovers the symbols) may cause the phase of the pilot signal thenceforth (in subsequent symbol periods) to be substantially different from what the phase would have been if there had been no offset correction. This may lead to a sudden jump in the phases of the pilots, and may degrade/disrupt the operation of PLL 600. Accordingly, it may be desirable to undo the corrections done to the pilot signals, as described next.

Canceling Pilot Phase Correction

This section describes the manner in which phase changes in a pilot signal occurring due to carrier frequency offset correction done in the time domain may be canceled in an embodiment of the present invention.

Assuming x(i) (for values of i=0 through N−1) represents the samples of the uncorrected multi-carrier base-band signal (for example, signal on path 345 of FIG. 3) in a symbol period, and y(i) (for values i=0 through N−1) represents the samples of the frequency offset corrected multi-carrier baseband signal (for example, signal on path 356 of FIG. 3) in the same symbol period, then it can be shown that x(i) and y(i) are related as given by equation 6 below:

$$y(i) = x(i) * e^\wedge (j*2*pi*f(k)*Ts)$$  Equation 6 wherein, f(k) is the estimated carrier frequency offset at symbol period k,

Ts is the sampling period, j is the complex operator,

^ represents the 'power of' operator.

Assuming X(k) and Y(k) represent the frequency components at the kth sub-carrier then the relation between the X(k) and Y(k) provides the factor that may be used to cancel the phase change in the pilot signal.

Y(k) may be given expressed according to the following equation:

$$Y(k) = \sum_{i=0}^{N-1} y(i) e^{-j\frac{2\pi i k}{N}}$$  Equation 7

Applying the result of equation 6 to equation 7 provides:

$$Y(k) = \sum_{i=0}^{N-1} x(i) e^{-j2\pi\left(f_0 + \frac{k}{NT_s}\right)iT_s}$$  Equation 8

Therefore, $$Y(k) = X(z) \Big|_{z = e^{j2\pi\left(f_0 + \frac{k}{NT_s}\right)T_s}}$$  Equation 9

Thus, Y(k) is related to the X(z) which is the z-transform of x(i).

X(z) may be expressed by the following equation:

$$X(z) = \sum_{n=0}^{N-1} x(n) z^{-n}$$  Equation 10

-continued
$$= \sum_{n=0}^{N-1} \sum_{l=0}^{N-1} X(l) e^{j2\pi \frac{nl}{N}} z^{-n}$$

Combining equations 9 and 10 provides:

$$Y(k) = \sum_{n=0}^{N-1} \sum_{l=0}^{N-1} X(l) e^{-j2\pi\left(f_0 + \frac{k-l}{NT_s}\right)nT_s}$$  Equation 11

Equation 11 may be simplified to provide:

$$Y(k) = \sum_{l=0}^{N-1} X(l) \frac{e^{-j2\pi\left(f_0 + \frac{k-l}{NT_s}\right)NT_s/2} \sin\left(2\pi\left(f_0 + \frac{K-l}{NT_s}\right)NT_s/2\right)}{e^{-j2\pi\left(f_0 + \frac{k-l}{NT_s}\right)T_s/2} \sin\left(2\pi\left(f_0 + \frac{k-l}{NT_s}\right)T_s/2\right)}$$  Equation 12

Equation 12 provides the relation between the kth sub-carrier of Y and the lth sub-carrier of X.

Assuming inter-channel interference (ICI) to be very minimal, then the summation in equation 12 can be evaluated for just l=k.

Therefore, the relation between phases of Y(k) and X (k) is:

$$\angle X(k) = \angle Y(k) + 2\pi f_0 \left(\frac{N-1}{2}\right) T_s$$  Equation 13

It may be observed from equation 13 that in order to cancel phase change due to carrier frequency offset correction performed in the time domain, a cancellation factor as given in equation 14 below may be used:

Cancellation factor=2*π*f0*((N−1)/2)*Ts  Equation 14 wherein fo is the estimate of frequency offset that is fed back to the time domain, and is equal to f(k) of equations 1 and 3.

The cancellation factor given by equation 14 is provided by frequency domain processing block 380 on path 387. Pilot correction cancellation block 370 adds the cancellation factor to each individual pilot phase. This same cancellation factor is subtracted from the phase offset estimated by frequency domain processing block 380, since the time domain (offset correction block 350) would already have corrected for it before FFT block 360 recovers the symbols.

A multi-channel receiver thus implemented can be used in a system/device, as described next with an example embodiment.

System/Device

Figure 7:
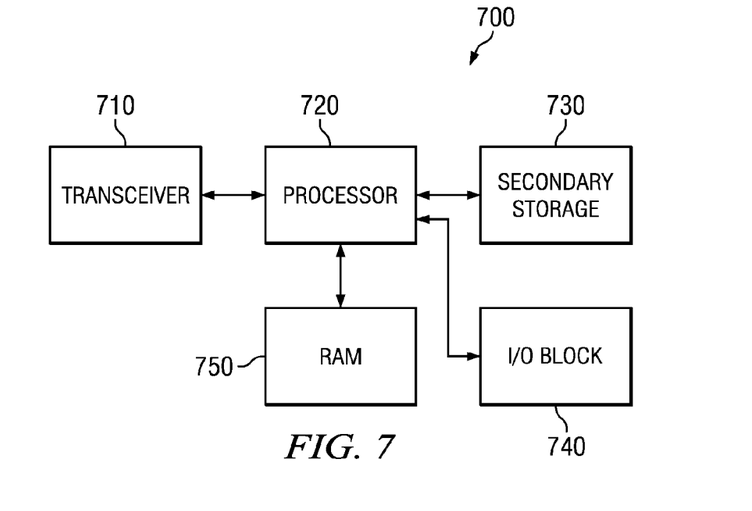
FIG. 7 is a block diagram of an example system in which several aspects of the present invention are implemented.

FIG. 7 is a block diagram of an example system/device in which several aspects of the present invention can be implemented. The device may correspond to a computer, phone, a hand-held device, multi-media device, etc., which communicates using multi-carrier signals (on wire-based or wireless paths), as noted above.

Transceiver 710 may contain both a transmitter and a receiver, with the receiver being implemented using the features described above. The transmitter transmits data (received from processor 720) as a multi-carrier signal. The receiver receives a multi-carrier signal and recovers data (as described above), and forwards the recovered data to processor 720. In an embodiment, transceiver 710 is implemented according to 802.11(a) OFDM standard.

Processor 720 generates digital data for transmission, in addition to processing the received decoded data. Processor 720 may access various instructions and data from RAM 750 to generate data and process the decoded data. RAM 750 may be implemented using any commercially available memories.

Secondary storage 730 provides non-volatile storage for storing data/instructions corresponding to user applications. The instructions/data may be retrieved into RAM 750 prior to execution.

I/O block 740 may provide various input/output ports. The input ports may be used to receive user inputs and the output ports may be used to provide data in a corresponding desired format (e.g., voice/display signals/video, etc.).

CONCLUSION

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of recovering data symbols from a multi-carrier signal having a plurality of sub-channels, said multi-carrier signal having a first carrier frequency and comprising a plurality of streams of symbols encoded in a corresponding one of said plurality of sub-channels, wherein a first set of streams of symbols comprising a first pilot symbol contained in a first sub-channel of said plurality of sub-channels and a second pilot symbol contained in a second sub-channel of said plurality of sub-channels, wherein said first set of streams of symbols constitute pilot symbols and a second set of streams of symbols constitute said data symbols, wherein said first set of streams of symbols and said second set of streams of symbols are comprised in said plurality of streams of symbols, wherein said pilot symbols are associated with a predetermined characteristic, said method comprising:

receiving said multi-carrier signal;

down-converting said multi-carrier signal using a second carrier frequency to obtain a base band signal, wherein a carrier frequency offset equals a difference of said first carrier frequency and said second carrier frequency;

processing said base-band signal to recover said plurality of streams of data symbols as well as a phases of pilot signals contained in said first set of streams of symbols;

determining a carrier frequency offset based on a deviation of weighted average of said phases of said first pilot symbol and said second pilot symbol from said predetermined characteristic;

providing said weighted average of the phases to a phase locked loop (PLL) to obtain an estimate of said carrier frequency offset, wherein said estimate of said carrier frequency offset is used to generate a carrier frequency offset correction factor; and correcting for said carrier frequency offset using said carrier frequency offset correction factor in said time domain before said processing processes said base-band signal, wherein said correcting corrects for said carrier frequency offset in said data symbols as well as said pilot symbols generating a cancellation factor to cancel a correction in said pilot symbols for said carrier frequency offset caused by said correcting.

2. The method of claim 1, wherein both said multi-carrier signal and said base-band signal represent said plurality of streams of symbols, wherein said processing processes said base-band signal to represent said plurality of streams of symbols to a frequency domain, whereby said correcting is performed in a time domain, and said determining and said processing are performed in said frequency domain.

3. The method of claim 1, wherein said PLL is designed to generate an estimate of a current phase of said at least one pilot signal based both on past phase values of said at least one pilot signal as well as a current phase value of said at least one pilot signal obtained during said processing.

4. The method of claim 3, wherein said cancellation factor equals $$2\pi f_0\left(\frac{N-1}{2}\right)T_s,$$

wherein $f_o$ represents said estimate of said carrier frequency offset, N represents a number of sample points of said base-band signal used in said processing, and $T_s$ is a sampling period.

5. The method of claim 2, wherein said multi-carrier signal is an orthogonal frequency division multiplexed (OFDM) signal.

6. A receiver for recovering data symbols from a multi-carrier signal having a plurality of sub-channels, said multi-carrier signal having a first carrier frequency and comprising a plurality of streams of symbols encoded in a corresponding one of said plurality of sub-channels, wherein a first set of streams of symbols constitute pilot symbols and a second set of streams of symbols constitute said data symbols, wherein said first set of streams of symbols and said second set of streams of symbols are comprised in said plurality of streams of symbols, wherein said pilot symbols are associated with a predetermined characteristic, said receiver comprising:

a down-converter down-converting said multi-carrier signal using a second carrier frequency to generate a base-band signal, wherein a carrier frequency offset equals a difference of said first carrier frequency and said second carrier frequency;

an offset correction block changing a frequency of said base-band signal by a magnitude determined by a correction factor, wherein said frequency is changed by processing said base-band signal in a time domain;

a signal recovery block processing said base-band signal to recover a first set of pilot symbols comprised in said first set of streams of symbols a pilot correction cancellation block operating to reverse said frequency offset correction on said first set of streams of symbols; and a frequency domain processing block processing said first set of pilot symbols to determine said correction factor based on a deviation of said first set of pilot symbols from said predetermined characteristic.

7. The receiver of claim 6, wherein said frequency domain processing block comprises a second order phase lock loop (PLL) which tracks the phase of said first set of streams of symbols to generate said correction factor.

8. The receiver of claim 6, wherein said first set of pilot symbols comprises a first pilot symbol contained in a first sub-channel, and a second pilot symbol contained in a second sub-channel, wherein said frequency domain processing block determines said correction factor based on a deviation of a weighted average of the phases of said first pilot symbol and said second pilot symbol from said predetermined characteristic, said first sub-channel and said second sub-channel being comprised in said plurality of sub-channels.

9. A device comprising:
   a processor processing a plurality of digital codes; and
   a receiver generating said plurality of digital codes by recovering data symbols from a multi-carrier signal having a plurality of sub-channels, said multi-carrier signal having a first carrier frequency and comprising a plurality of streams of symbols encoded in a corresponding one of said plurality of sub-channels, wherein a first set of streams of symbols constitute pilot symbols and a second set of streams of symbols constitute said data symbols, wherein said first set of streams of symbols and said second set of streams of symbols are comprised in said plurality of streams of symbols, wherein said pilot symbols are associated with a predetermined characteristic, said receiver comprising:
   a down-converter down-converting said multi-carrier signal using a second carrier frequency to generate a base-band signal, wherein a carrier frequency offset equals a difference of said first carrier frequency and said second carrier frequency;
   an offset correction block changing a frequency of said base-band signal by a magnitude determined by a correction factor, wherein said frequency is changed by processing said base-band signal in a time domain;
   a signal recovery block processing said base-band signal to recover a first set of pilot symbols comprised in said first set of streams of symbols
   a pilot correction cancellation block operating to reverse said frequency offset correction on said first set of streams of symbols; and
   a frequency domain processing block processing said first set of pilot symbols to determine said correction factor based on a deviation of said first set of pilot symbols from said predetermined characteristic.

* * * * *